United States Patent [19]

Mayo

[11] Patent Number: 4,683,893
[45] Date of Patent: Aug. 4, 1987

[54] AMPLITUDE CONDITIONAL SIGNAL PROCESSING FOR ULTRASOUND FREQUENCY ESTIMATION

[75] Inventor: William T. Mayo, Seal Beach, Calif.

[73] Assignee: North American Philips Corporation, New York, N.Y.

[21] Appl. No.: 880,402

[22] Filed: Jun. 30, 1986

[51] Int. Cl.⁴ ............................................. A61B 10/00
[52] U.S. Cl. .................................................... 128/660
[58] Field of Search ........................... 128/660; 73/599; 329/129–130, 135–136

[56] References Cited

U.S. PATENT DOCUMENTS 4,512,196  4/1985  Barnes ............................ 128/660 X
4,515,163  5/1985  Flax et al. ........................... 128/660
4,605,008  8/1986  Ferrari ................................. 128/660

Primary Examiner—Kyle L. Howell
Assistant Examiner—Francis J. Jaworski
Attorney, Agent, or Firm—Jack E. Haken; James J. Cannon, Jr.

[57] ABSTRACT

In an ultrasonic diagnostic system the invention utilizes the concept that for pulse echo medical ultrasound signals the mean instantaneous frequency estimates are improved by imposing the condition that a local frequency estimate is ignored unless a condition of the amplitude exceeding some threshold is met. It provides for the use of conditional frequency or zero crossing rate measurement as applied to ultrasound attenuation measurement and also to local frequency shift measurement due to frequency dependent scattering. The system simultaneously detects the amplitude of the signal, delays the RF waveform to satisfy causality and then conditionally accepts the frequency demodulated image only when a preselected amplitude is exceeded. The system requires that the amplitude of the instantaneous RF signal exceed a set threshold in order for the half cycle of the signal to be processed. It then uses a threshold comparator which causes a track and hold signal to hold during the period when the RF signal amplitude is below the threshold and which tracks the RF signal when its amplitude exceeds the threshold.

5 Claims, 12 Drawing Figures

AMPLITUDE CONDITIONAL SIGNAL PROCESSING FOR ULTRASOUND FREQUENCY ESTIMATION

BACKGROUND OF THE INVENTION

1. Field of the Invention

The invention relates to a system which utilizes ultrasound pulse echo techniques to image the internal structures of a body. More specifically, the invention relates to a system, including an apparatus and a method, which improves frequency estimation for the purpose of ultrasonic tissue characterization and/or tissue frequency imaging.

2. Description of the Prior Art

Ultrasound pulse echo imaging has become an important modality for medical diagnosis. Pulses of ultrasound energy are produced in a transducer and directed into a body. The energy is scattered from organ boundaries and other impedance discontinuities within the body, generating echoes which are detected with a transducer (which may be the same transducer used for transmission) to produce electrical signals which are then processed to form an image of internal body structures. Most ultrasound pulse echo imaging systems of the prior art generate images from information which is extracted from the AM envelope of the pulse echo signals. More recently, techniques have been disclosed for producing images utilizing information which is contained in the FM envelope of an ultrasound pulse echo signal. Even more recently compound systems have been developed for imaging wherein the intensity of pixels is modulated as a nonlinear function of both the amplitude and the frequency deviation of the pulse echo signal.

The use of zero crossing detectors for determining ultrasonic wave attenuation in tissue is known in the prior patent art. U.S. Pat. No. 4,515,163, issued to Flax et al. discloses a zero crossing detector for ascertaining and eliminating undesirable waveform characteristics. U.S. Pat. No. 4,543,826, issued to Ferrari also discloses a zero crossing technique. Ferrari discloses the use of an FM demodulator for image formation. However, the use of a strict FM demodulator results in a seemingly meaningless image in practice because the lowest amplitude signals produce large and random frequency swings which appear as gray scale noise. This problem has been overcome in practice by others by the addition of a relatively large sinusoidal squelch signal which simultaneously eliminates the contribution of the lowest amplitude signals and converts the FM demodulator into a new form of demodulator which seems to have more amplitude sensitivity than frequency sensitivity. This demodulation scheme which has been employed by others was not anticipated in the Ferrari patent wherein squelch was considered to be a relatively low amplitude noise quieting device which would not interfere with the frequency detection process of the signals which would normally have been expected to be much larger than the squelch in amplitude. Neither of the prior art patents discussed includes a conditional threshold for zero crossing.

Conditional, or thresholded amplitude, zero crossing techniques have been used in the field of laser Doppler velocimetry (fluid flow instrumentation) since the late 1960's. However, there is no evidence in the literature or in the patent art of the application of these techniques in ultrasound tissue characterization.

The object of the present invention is to improve medical ultrasound imaging techniques by improving the propagation attenuation measurement of pulse echo signals and improving the imaging of the frequency shift of the back scattered wave due to local tissue scattering properties. The present invention uses conditional, that is, thresholded amplitude, zero crossing techniques to improve frequency estimation for ultrasound tissue characterization. This leads to a considerable reduction in the large uncertainty of the output frequency estimate which arises in low signal regions, without the distorting the local zero crossing rate.

SUMMARY OF THE INVENTION

The object of the invention is achieved by implementing in an ultrasonic diagnostic system the concept that for pulse echo medical ultrasound signals the mean instantaneous frequency estimates are improved by imposing the condition that a local frequency estimate is ignored unless a condition of the amplitude exceeding some threshold is met. The system provides for the use of conditional frequency or zero crossing rate measurement as applied to ultrasound attenuation measurement and also to local frequency shift measurement due to frequency dependent scattering. Thus the system provides an improved method for imaging meaningful localized frequency estimates of regions in the body. The objects of the invention are achieved in that the system simultaneously detects the amplitude of the signal, delays the RF waveform to satisfy causality and then conditionally accepts the frequency demodulated image only when a preselected amplitude is exceeded.

The system requires that the amplitude of the instantaneous RF signal exceed a set threshold in order for the half cycle of the signal to be processed. It then uses a threshold comparator which causes a track and hold signal to hold during the period when the RF signal amplitude is below the threshold and which tracks the RF signal when its amplitude exceeds the threshold. The half cycles which pass the conditional test are measured as to time interval and the instantaneous frequency is defined over the half cycle as 0.5 times the inverse of the half cycle duration. It uses a low pass filter to smooth the discontinuities in the track and it adds a time frequency compensation signal to provide a filtered frequency modulated signal to a scan converter. The outputted signal is an improved frequency estimate.

In a second embodiment of the Invention, an adaptive threshold is provided for improved frequency imaging of non-uniform tissue. In this embodiment a local running average of the amplitude of the RF signal is computed and used as the threshold. In this second embodiment, both the unsmoothed AM signal and the demodulated FM signal must be delay matched to the delay of the smoothed adaptive threshold signal.

In a third embodiment, the invention is extended to two scan planes of a multiple scan plane ultrasonic imaging system, and the conditional thresholding and track and hold circuits are replaced by two dimensioned thresholding and interpolation.

BRIEF DESCRIPTION OF THE DRAWING

FIG. 1A is the RF waveform in the envelope (AM signal); and

FIG. 1B is a positive magnitude of the instantaneous frequency deviations from mean frequency computed as a derivative of the phase of the analytic signal representations;

DESCRIPTION OF THE PREFERRED EMBODIMENT

Figure 1A:
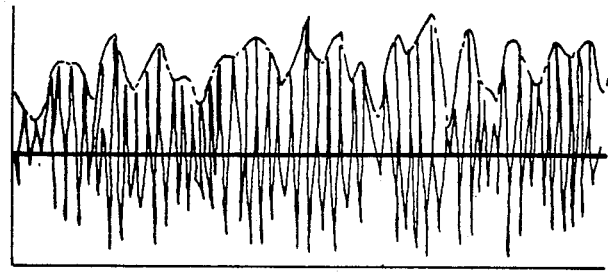
FIGS. 1A and 1B illustrate digitized phantom data from a laboratory ultrasound system.

The present invention pertains to amplitude conditional signal processing for ultrasound frequency estimation, or conditional frequency estimation. The object of the present invention is to improve frequency estimation for the purpose of ultrasonic tissue characterization and/or tissue frequency imaging.

It has long been known in the field of laser velocimetry that a single ideal burst sinusoid signal has an exactly measurable zero crossing rate, or instantaneous frequency, in the absence of noise. An example of such signal is a product of a single frequency sinusoid and a Gaussian pulse. When many such signals are summed with random occurrence times and random amplitudes, as in a laser velocimeter signal, then the zero crossing rate is randomly perturbed by the interference between the component signals. However, the best estimate of the single burst zero crossing rate is obtained by setting an amplitude threshold and only measuring the local zero crossing rate where the composite signal exceeds the threshold. When the random spacing of the component signals is dense, so that many burst signals overlap, the improvement in estimation is only modest. However, when the bursts are sparse, so that the largest amplitude bursts are mostly nonoverlapping, then very precise estimates of the single burst frequency can be made using a relatively high amplitude threshold to eliminate all the lower amplitude signals which contain a high degree of perturbation of the instantaneous frequency due to multisignal interference.

The present invention is based on the concept that, for pulsed medical ultrasound signals, mean instantaneous frequency estimates are improved by imposing the condition that the local frequency estimate is ignored unless the condition of amplitude exceeding some threshold is met. Therefore, the primary invention is the use of conditional frequency or zero crossing rate measurement as applied to ultrasound attenuation measurement and also to local frequency shift measurement due to frequency dependent scattering. The use of the invention may be in either analog or digital signal processing hardware or in software with digitally sampled data. The invention is not limited to localized frequency estimates of isolated relatively bright scattering centers; it also improves frequency estimates in relatively homogeneous tissue, such as liver, by eliminating valid frequency fluctuations which occur in the low amplitude regions caused by coherent interference artifact (speckle). This system simultaneously detects the amplitude of the signal, delays the RF waveform to satisfy causality and then conditionally accepts the frequency demodulated image only when a preselected amplitude is exceeded.

The use of conditional or thresholded zero crossing improves the stability of local frequency measurements by avoiding low amplitude signal regions. This approach is based on the following very general theory. The instantaneous frequency, defined by the analytic signal, and the zero crossing frequency, measured by the inverse of twice the distance between successive zero crossings, are relatively stable under signal regions of local envelope maxima and very unstable in regions of envelope minima. In the unstable regions, the variation of any local frequency estimates is large and spikes occur. These frequency spikes introduce large statistical uncertainty in the otherwise better behaved frequency estimates from the relatively higher amplitude regions. Locations of the greatest frequency stability coincide with the envelope maxima as obtained in two dimensions, which would be the locally bright spots in the standard echo amplitude image. The present invention pertains to both suboptimal one dimensional (A-line) frequency estimation techniques and also two-dimensional techniques (as a third preferred embodiment). First, non-adaptive A-line processing will be discussed in the context of a non-adaptive analog implementation of conditional FM.

Figure 1B:
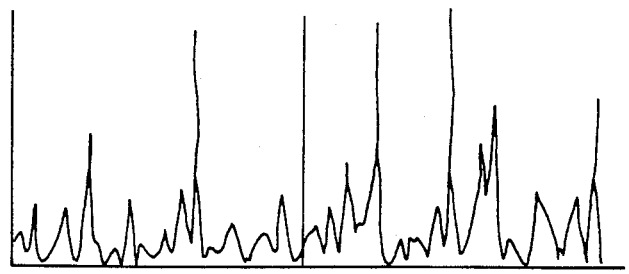

FIGS. 1a and 1b illustrate digitized phantom data from a laboratory ultrasound system. FIG. 1a is the RF waveform and the envelope (AM signal) and FIG. 1b is the positive magnitude of the instantaneous frequency deviations from mean frequency computed as the derivative of the phase of the analytic signal representation. A similar result occurs with a zero crossing frequency estimate. The frequency deviations appear noticeably large at locations of low amplitude.

Figure 2A:
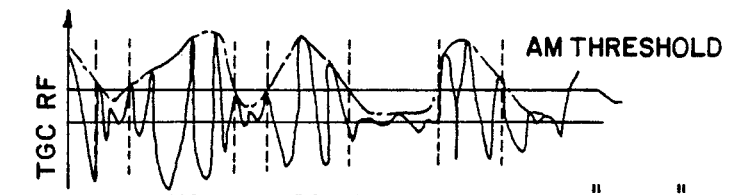
FIGS. 2a, 2b and 2c illustrate conceptually the signal processing of the present invention.
Figure 2B:
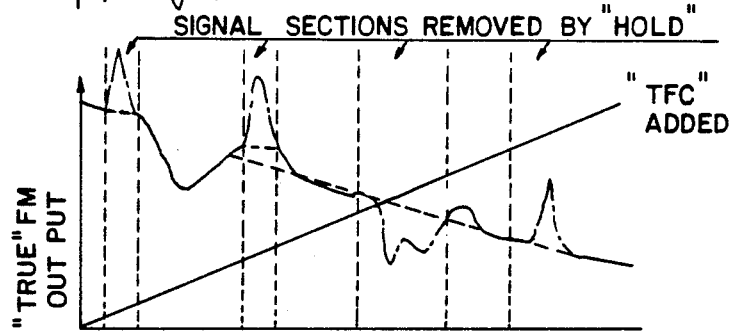
Figure 2C:
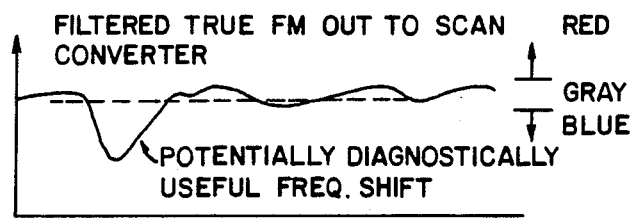
Figure 3:
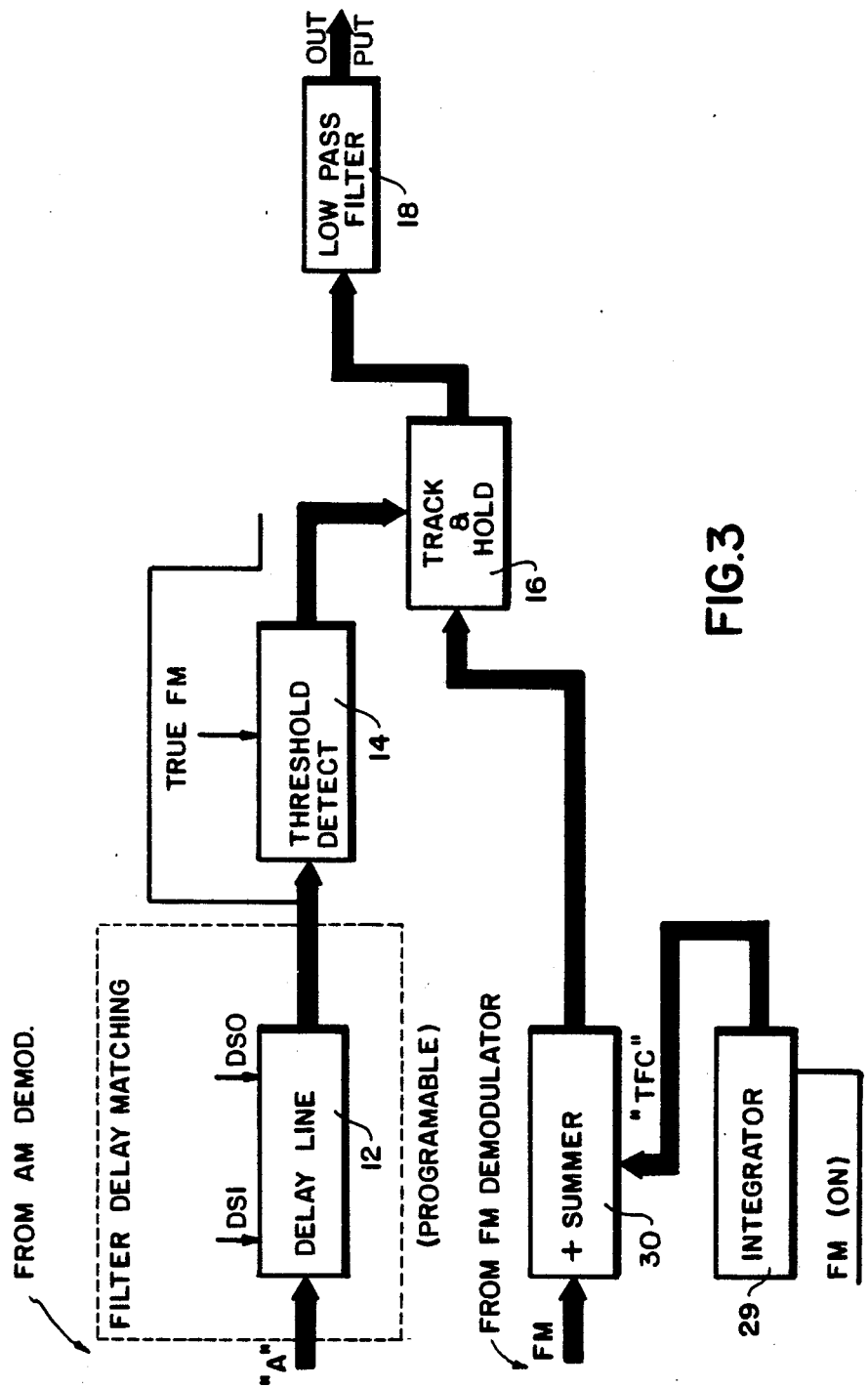
FIG. 3 is a block diagram of a multipurpose demodulator circuit showing the true FM path (emphasized) of the system of the present invention.

FIGS. 2 and 3 illustrate how the signal processing works in a non-adaptive A-line system. The block diagram FIG. 3 illustrates in the emphasized (thick) lines the true FM path through a multipurpose demodulator circuit, which emphasized path is the part of the diagram relevant to the present invention. In the, "true" FM mode the squelch is set to a very low value which prevents receiving noise capture when no signal is present. An RF waveform is received from an AM demodulator through delay 12. The delay of the demodulated AM waveform in delay 12 and the input to a summer 30 from an FM demodulator (not shown) are matched to align both components of the signal in time. A threshold detector 14 or comparator detects whether or not the demodulated AM signal exceeds a preset threshold amplitude, and causes a track and hold circuit 16 to hold during periods of signal amplitude below said threshold. This process results in small step discontinuities illustrated in FIGS. 2a and 2b when tracking resumes, but these discontinuities will be smoothed by a low pass filter 18. FIG. 2b illustrates the addition of a calibrated time frequency compensation factor from integrator 29 (FIG. 3) TFC, which is an estimate of the average attenuation frequency shift read from the main frequency slope over the region of interest observed. In FIG. 3 the TFC from integrator 29 is added in a summer 30 to the input from an FM demodulator (not shown) and then fed to the track and hold circuit 16 which may include a zero order interpolator. FIGS. 2b and 2c illustrate how the addition of a time frequency compensation signal yields an FM signal which is positive and negative with respect to the slower varying mean frequency. These values will mapped to some positive offset for purposes of scan conversion but the sign of the deviation will be preserved in the mapping. Since the track and hold circuit 16 only tracks the output of the FM demodulator received via summer 30 during the time the AM envelope exceeds the threshold amplitude, the resulting FM demodulated signal has fewer spikes, thus the output of the low pass filter 18 is an improved frequency estimate without a block-like look which accompanies unconditional FM demodulation.

Figure 4A:
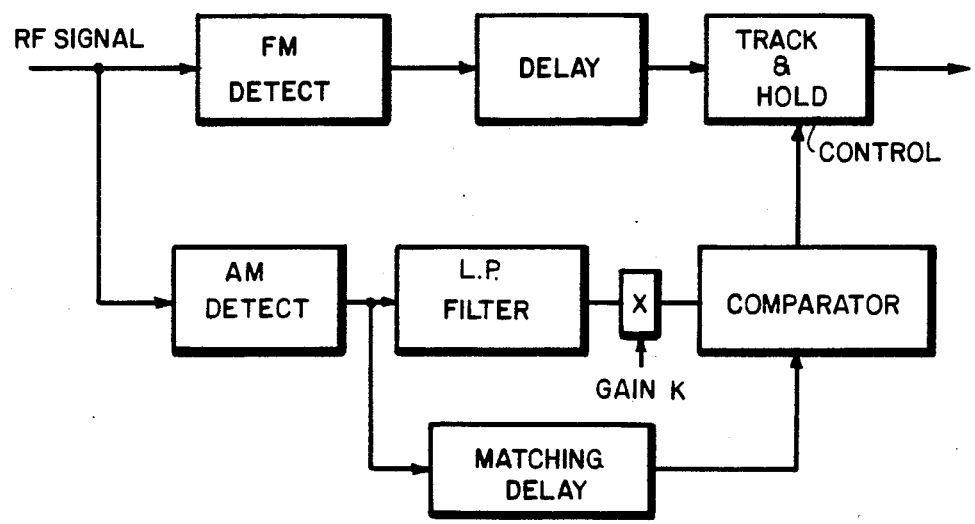
FIG. 4a is a block diagram of an adaptive conditional FM system of the present invention.
Figure 4B:
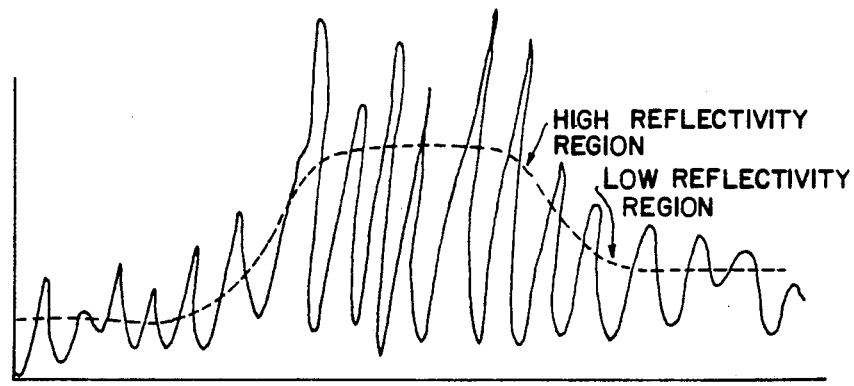
FIG. 4b is the signal envelope in the local mean tissue reflectivity.

The conditional zero crossing technique and system described above is well suited to imaging a nearly uniform tissue such as the liver, where with proper time gain compensation (TGC) a single threshold will be appropriate. In other cases, the local mean tissue reflectance usually varies significantly in a general ultrasound image. Therefore, under general conditions it will be necessary to delay the RF signal, or a sampled version of it, sufficiently long enough to allow formation of a local running average (with a linear or nonlinear low pass filter) which can be used as an adaptive threshold for the conditional frequency estimation. This is illustrated in FIG. 4.

Figure 5A:
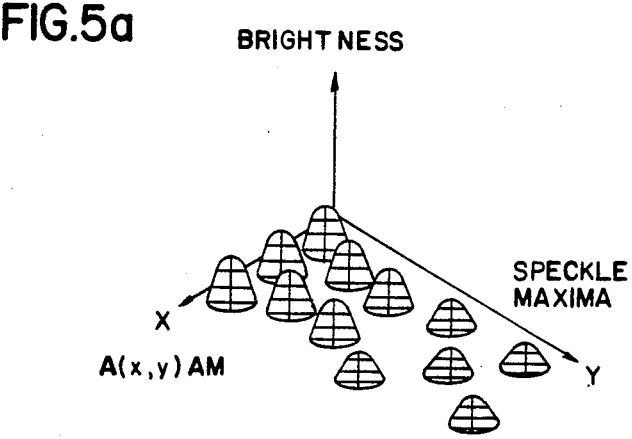
FIG. 5a shows an AM and an unfiltered FM image in two scan planes.
Figure 5B:
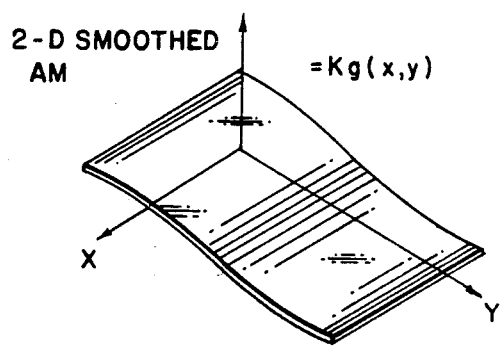
FIG. 5b shows the scan planes of FIG. 5a with the AM image filtered.
Figure 5C:
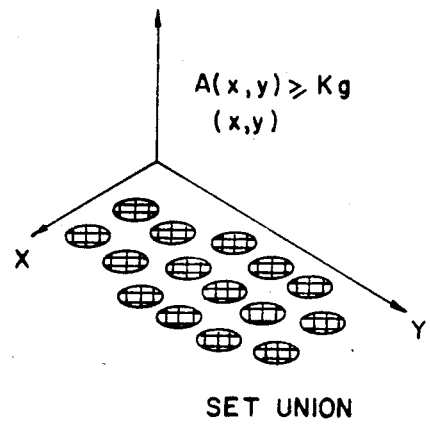
FIG. 5c shows locations on the scan planes of FIG. 5b where a threshold is exceeded.
Figure 5D:
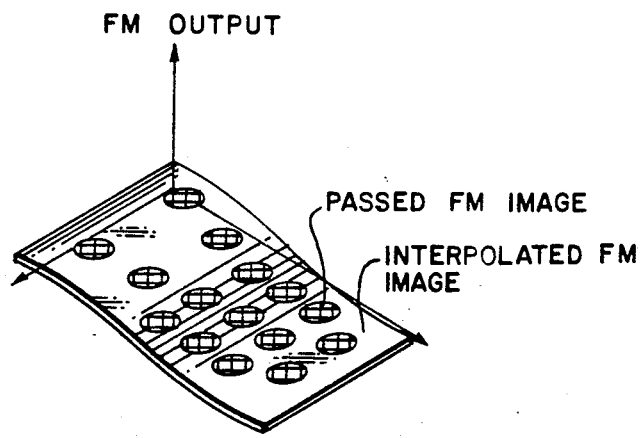
FIG. 5d shows the scan planes of FIG. 5c with an interpolated FM image.

The most general extension of the invention is to treat the signal processing problem two-dimensionally. As illustrated in FIG. 5 an AM and an unfiltered FM image of the same RF signal are formed in two scan planes of a multiple-scan-plane ultrasound imaging system. FIG. 5a illustrates the AM image with the novel coherent interference artifact (speckle). Next, in FIG. 5b the AM image is spatially low-pass filtered with either a linear or nonlinear low-pass smoothing filter, and multiplied by a constant. A variety of nonlinear filtering operations may be involved including for example, replacing the AM image with the logarithm of the amplitude prior to low pass filtering or speckle reduction filters. After low-pass filtering, the set union of all the locations is obtained as shown in FIG. 5c where the unfiltered AM image exceeds the low pass filtered image multiplied by a constant. This set of points is used as shown in FIG. 5d to allow the FM image to pass unmodified (analogous to "track" in "track and hold"). At all the other points in the image space, the FM image is replaced with a two dimensional extrapolation of the edges of the portions passed (average values between nearest non-replaced values or some other interpolation may be used analogous to "hold" in one dimensional case shown in FIG. 3). In the simplest situation, the non-passed values are replaced by the TFC corrected estimate of the transducer center frequency for each depth. Finally, a 2D smoothing filter may be applied to eliminate discontinuities in the FM after the interpolation steps.

This 2-D scheme is easily be implemented as a color computed freeze-frame image with the following procedure:
(a) freeze an AM and an FM image (real FM with little or no squelch).
(b) Read both images to the CPU or an array processor memory via a bus and return control to live scanning while computation takes place.
(c) Compute a new image consisting of an M bit brightness image (from the AM image only and an N bit color tinting image (from conditional FM) using a hue and saturation modulation with frequency deviation as the parameter (M+N=number of display bits available). The frequency deviation image is computed by one or more of the methods outlines above.
(d) Transfer the composite color image back to one scan plane memory for display, and activate a "color display ready" signal. (Details concerning color tinting schemes for displaying an AM image color tinted by a frequency image have been described in a previous patent application by Mayo.)

Obviously it would be preferable to show a real time image of the colored result. This can be done with additional scan plane memory, and a real time 2-D low-pass filter.

Either analog or digital implementations of the technique of the present invention are possible. With analog techniques, it is difficult to interpolate the missing portions of the frequency estimate with much better than zero-order (track and hold) techniques. With digital techniques it is possible to use higher order interpolations such as b-splines to fill in the missing signals.

The system may also be implemented in software with digitally sampled data. The first trial of the invention was a software simulation of a hardware system which required the amplitude of the instantaneous RF signal to exceed a certain threshold in order for the half cycle of the signal to be processed. The half cycles which passed the conditional test were measured as to time interval, and the instantaneous frequency was defined over the half cycle as 0.5 times the inverse of the half cycle duration. The software has been used to estimate the local mean frequency of a simulated data set and also a digitized data set from an in vivo liver scan. In each test, the results were compared with the use of a conventional zero crossing (unconditional) technique. The conditional zero crossing method as disclosed herein gave less variability with the identical input data set. Thus, the use of conditional zero crossing for the estimation of attenuation induced frequency down shift has been established as an improvement over conventional zero crossing with respect to the amount of data required to obtain a specified error level. An improved method for imaging meaningful localized frequency estimates of isolated relatively bright scattering centers or regions in the body would make use of the invention described herein, namely, to simultaneously detect the amplitude of the signal, delay the RF waveform to satisfy causality and then conditionally accept the frequency demodulated image only where a preselected amplitude is exceeded.

What is claimed:

1. In an improved system for conditional estimation of frequency of ultrasonic waves in a medium using the RF signal of pulse echo data, wherein said system receives pulse echo data in the form of an rf signal, demodulates the AM component of said rf signal in an AM demodulator; and demodulates the FM component of said RF signal in an FM demodulator; and processes both the demodulated AM signal and the demodulated FM signal simultaneously, delaying the AM signal to match the delay in output from said FM demodulator, a conditional signal processing means comprising:

means to add a time-frequency compensation factor to the demodulated FM signal which estimates the attenuation induced frequency downshift over time;

means to set a threshold for the amplitude of said demodulated AM signal;

means to determine when said demodulated AM signal falls below said threshold;

means to interrupt the processing of said FM signal when said AM signal falls below said threshold, discarding all FM signals until said AM signal rises above said threshold;

means to retain the last value of said FM signal during said interruption;

means to resume the processing of said FM signal after said AM signal exceeds said threshold; and means to interpolate the frequency of said FM signal during said interruption;

thereby providing an improved estimate of the frequency of said FM signal.

2. A system for conditional threshold estimation of frequency of ultrasonic waves in a medium from pulse echo data, wherein said pulse echo data is received as an RF signal, and the AM and FM components of said RF signal are demodulated simultaneously, comprising:

means to detect the amplitude of the RF signal;

means to delay the RF signal to satisfy causality;

means to set a threshold for the amplitude of the AM component of said RF signal;

means to estimate the frequency of said FM component signal only if said signal exceeds the amplitude threshold;

wherein said means comprises:

for an RF signal exceeding said amplitude threshold, means to calculate the time interval of a half cycle, wherein the instantaneous frequency is defined as 0.5 time the inverse of the half cycle duration;

whereby said system estimates the attenuation induced frequency downshift by using a conditional zero crossing method.

3. A system for amplitude conditional signal processing for ultrasonic frequency estimation, said system having means to compute an RF waveform and its envelope, and means to output signals from AM and FM demodulators comprising:

means to add a time frequency compensation factor to the output of said FM demodulator;

means to delay a demodulated AM signal to match the delay of said FM signal;

means to set a threshold for the amplitude of an RF signal;

a threshold comparator, which passes said RF signal during periods when RF signal amplitude exceeds said threshold;

a track and hold circuit which tracks said RF signal when its amplitude exceeds said threshold and holds when the amplitude of said RF signal is below said threshold;

a zero order interpolator in said track and hold circuit;

a low pass filter coupled to said track and hold circuit to smooth discontinuities in said RF signal, thereby providing a filtered frequency modulated signal.

4. The system of claims 1, 2 or 3 wherein said means to set a threshold further includes means to set an adaptive threshold, said means comprising:

means to delay at least one of the rf signal and the demodulated AM and FM signals;

means to form a local running average of said RF signal using a low-pass filter;

means for setting an adjustable threshold by using said running average as an adaptive threshold for conditional zero crossing rate measurement for frequency estimation.

5. The system of claims 1, 2 and 3 wherein said system for conditional estimation of frequency is extended to two-dimensional processing of AM and FM demodulated signals stored in two scan planes, said system further comprising:

means to form two-dimensional unfiltered AM and an unfiltered two-dimensional FM image of the same RF signal;

means to filter spatially said AM image, and to multiply said image by a constant;

means to form the set union of all locations where said unfiltered AM image exceeds said low-pass filtered image multiplied by said constant;

means for passing the FM image unmodified at said locations; and means for replacing the unpassed FM image at all other locations with an image portion computed from the signals associated with the edges of said passed locations of the FM image; and means for filtering discontinuities in said FM image.

* * * * *